Jan. 21, 1964 W. W. CLEMENTS 3,118,987

ELECTROMAGNETIC BISTABLE RELAY

Filed June 10, 1960 3 Sheets-Sheet 1

Jan. 21, 1964 W. W. CLEMENTS 3,118,987

ELECTROMAGNETIC BISTABLE RELAY

Filed June 10, 1960 3 Sheets-Sheet 2

United States Patent Office 3,118,987 Patented Jan. 21, 1964

3,118,987

ELECTROMAGNETIC BISTABLE RELAY

Warner W. Clements, 13435 Java Drive,
Los Angeles, Calif.
Filed June 10, 1960, Ser. No. 35,187
4 Claims. (Cl. 200—87)

My invention relates to electromagnetic devices and more particularly to step-by-step devices of the type variously called "two-step sequence," "alternate impulse," and "binary latching."

My invention also relates to snap springs, snap switches, and the like.

The most obvious and immediate application of the invention is to the design of special-purpose relays. I shall particularly point out its usefulness in such an application. However, it should be understood that the very same features which make the invention valuable when applied to relay design may also make it highly useful in other and unrelated applications. I do not consider any objects stated herein to constitute the sole objects of the invention.

When relays are used, as they often are, in groups or banks of identical units, their function can be loosely described as "computational." At the present time there are emerging commercially built relay types especially designed for this kind of service. These new types are distinguished by their high reliability and exceedingly long service life, by their generally low power handling capabilities, by their compactness of construction, and by their rapidity of operation. Until now, only simple polarized or spring-return relays have been employed. Alternate impulse types have been neither reliable enough, long-lived enough, compact enough, nor fast-acting enough to be satisfactory in this kind of service. And yet, if there did exist an alternate impulse type that had the necessary qualities, it would fulfill a great need. In simple computers an alternate impulse relay could, for instance, perform much like an electronic flip-flop unit, while still retaining certain advantages peculiar to a relay.

Such a need is one that is met by the present invention. For the first time there is presented an alternate impulse relay that can be at one and the same time reliable enough, long-lived enough, compact enough, and fast-acting enough for the most demanding computational applications.

The invention teaches a magnetic construction that reduces moving parts to the smallest possible size and locates them in the center of a coil for compactness and best utilization of the magnetic field. It also teaches an unique, multi-purpose design for a snap spring. Finally, it teaches how the combination of said magnetic construction with said snap spring design results in the grouping of moving parts and electrical contacts in such a suitable arrangement that all may be conveniently hermetically sealed in a compact enclosure, the attendant advantages being apparent to those skilled in the art.

In what follows I will describe a specific embodiment before I delineate the general sense (or "essence") of the invention and list the special advantages it confers. This order of presentation, although unusual, will avoid repetition and should be easier for the reader to follow.

*Illustrative Embodiment*

Figure 1:
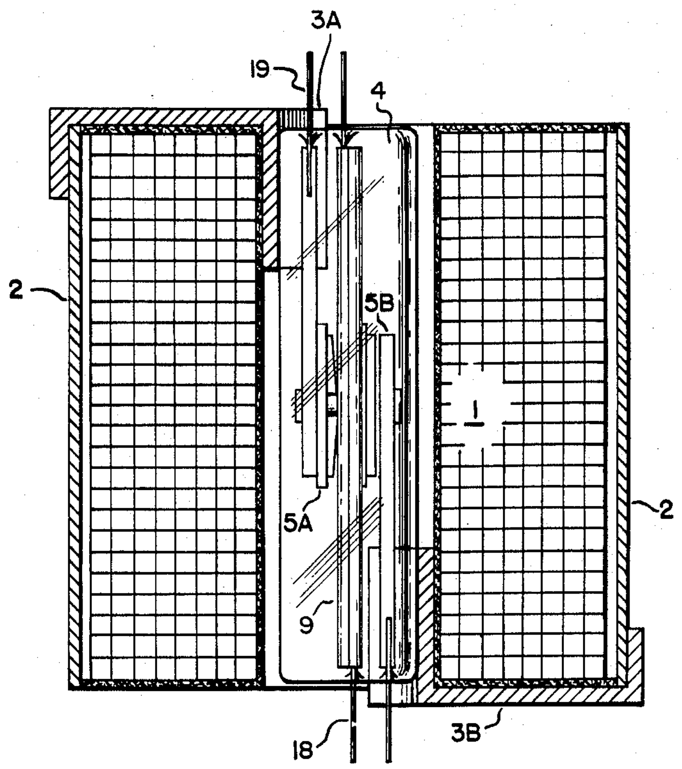
FIG. 1 is a central sectional view of the completed device. The centrally located glass envelope and its contents are shown as not being cut by the sectioning plane.
Figure 3:
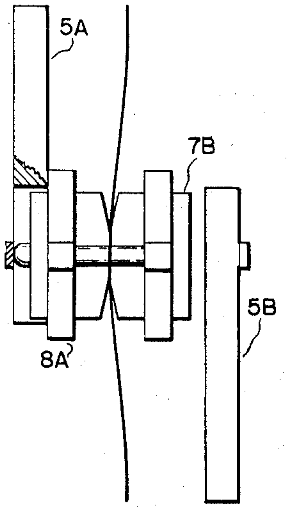
Figure 4:
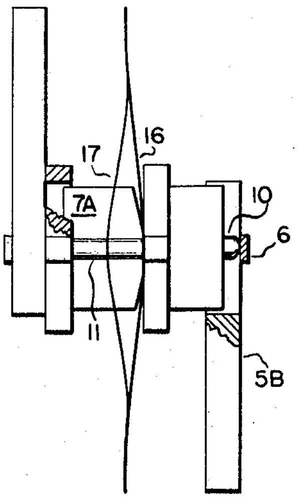
Figure 5:
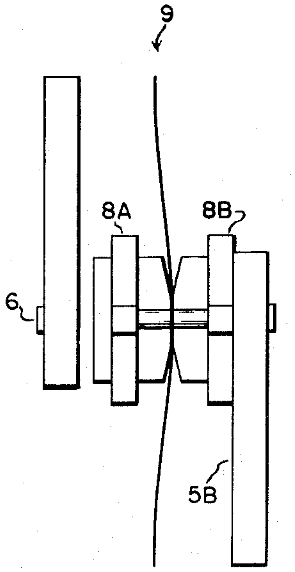

FIGS. 3 through 5 are somewhat diagrammatic representations of the central part of the device as seen in the same aspect as FIG. 1. Mounting detail has been omitted and all horizontal dimensions have been greatly exaggerated in order to more clearly reveal the functions of components. Taken in sequence, these three figures show a half-cycle in the operation of the device.

FIG. 3 shows the movable parts in the respective positions they will occupy when the device is in one of its two possible quiescent states, with no current being supplied to the coil. The near portion of the left pole piece is shown broken away to reveal detail beneath it.

FIG. 4 shows the movable parts in the positions they will assume upon the application of coil power under the circumstances of FIG. 3. A segment of magnetic material and the right-hand pole piece are depicted with portions broken away.

FIG. 5 shows the movable parts in the positions they will assume upon the discontinuance of coil power under the circumstances of FIG. 4.

The overall magnetic structure is most clearly shown in FIG. 1. Components made of iron (or any other suitable magnetic material) conduct the magnetic flux in a generally toroidal pattern around and through coil 1. On the sides of the coil the flux is conducted by a surrounding cylinder 2. On the ends of the coil and extending somewhat into its interior, the flux is conducted by stator members 3A and 3B. The entrant portions of these latter members are curved to conform with the hole in the coil but each is disposed on only one respective side of that hole. For the remainder of its trip through the center of the coil the flux is conducted through components within the tubular glass envelope 4. Two pole pieces, 5A and 5B, serve to pick up the flux from stator members 3A and 3B respectively. The relation between each pole piece and its neighboring stator member is closer than it may appear in elevation because of the width of both. If desired the pole pieces could, of course, be augmented by additional iron curved to fit the inside of the glass tube.

Figure 2:
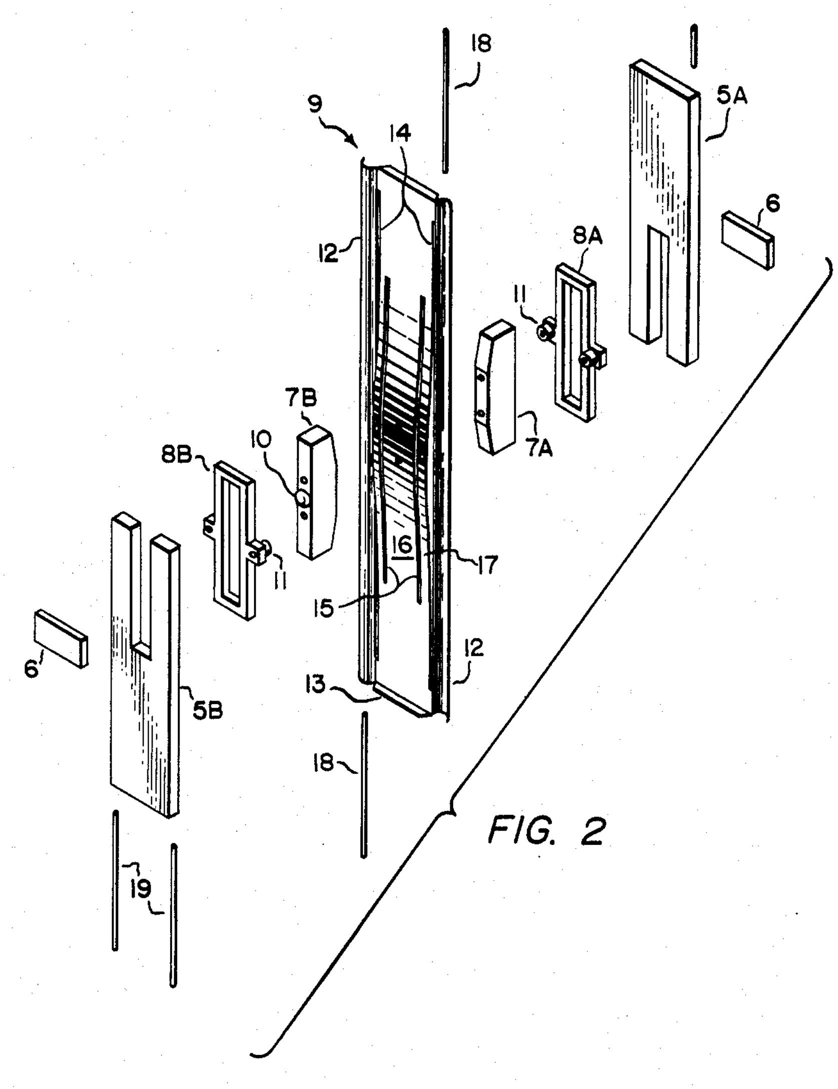
FIG. 2 is an exploded perspective view of the most important components. In order to show details which would otherwise be obscured, the view is of an aspect which is displaced in a horizontal sense 135° around the subject from the aspect of FIG. 1.

Further particulars are most clearly illustrated by FIG. 2. As shown, each pole piece is deeply slotted at its central end to provide an aperture which will just admit the armature with slight clearance. Across each slot is welded a contact bar 6, preferably made of precious metal.

All magnetic members described thus far are stationary ones. The remaining magnetic members, those located between the interior ends of the pole pieces, are movable. It is thus the slotted ends of the pole pieces that constitute respectively the opposing poles of the fixed magnetic structure. In generally bridging position between said poles is located the armature, whose iron halves are designated 7A and 7B. This element, assembled as an entity, is mounted to be movable back and forth along a line perpendicular to both pole pieces. Its size and the range of its permitted travel are such that a variable gap is created at each of the aforesaid poles. As the armature approaches one pole it recedes from the other, so that the reluctance of the respective gaps is varied simultaneously but inversely. In the process, the armature makes what might be called a "tangential" approach to each pole piece. In other words, a stroke of the armature, if it could be indefinitely extended, would take it right on through and past the pole piece, just clearing the latter on three sides. The purpose of this arrangement is to permit either of the two gaps just mentioned to be bypassed or "shunted out" by means of the control element. The latter element includes the two iron segments, 8A and 8B. The assembled control element, consisting principally of these segments, is mounted around the armature to be movable in a path paralleling that of the latter. The travel of the control element is limited to that between the extremes where one or the other of its iron segments engages the corresponding pole piece. The segments are shaped to match the openings in the pole pieces and to just clear the armature. It can be seen that when a segment is in engagement with a given pole piece the variable gap at that pole piece is effectively eliminated; any flux generated in the magnetic circuit will find a low reluctance path from pole piece to armature by going by way of the iron segment.

A snap spring member, indicated generally at 9, supports both the armature and the control element. It is for convenience in mounting to the snap spring that the armature is fabricated in two parts. Said parts are assembled by riveting them back-to-back with a portion of the snap spring between them. The very small resultant gap between armature halves offers but little reluctance to magnetic flux and for practical purposes the armature is a one-piece unit. Two electrical contacts 10, preferably made of precious metal, complete the armature assembly. It can be seen that melting of contacts 10 with contact bars 6 serves to limit the travel of the armature.

The control element is riveted to the snap spring in a somewhat similar fashion. However, in the latter case four small bosses or spacer washers 11 are provided to space the magentic segments apart from each other and from the snap spring. The spacer washers and the rivets used for assembly are preferably made of non-magnetic materials.

Snap spring member 9 is made from any suitable springy, non-magnetic sheet material. Phosphor bronze is a representative material and stamping is a suitable process for manufacture. The member is so designed that part of it is rigid and part of it is flexible. A rigid outer supporting frame is formed by channels 12 and flanges 13. The inner portion of the member is partially separated from the supporting portion by two long slits 14. This inner portion has a longitudinal stretch imparted to it during manufacture so that it is forced to bow out in one direction or the other and is thus bistable. (In actual manufacture it is important that the curvature be struck between dies first in one direction and then more lightly in the other. This will ensure that the completed unit does not "favor" one condition of stability more than the other.) The inner portion is further subdivided by slits 15 into a relatively broad portion 16 and two relatively narrow portions 17. The relative widths are so chosen that inner portion 16 is considerably stiffer (less flexible or compliant) than both outer portions 17 combined. Note, further, that inner slits 15 are shorter than outer slits 14. In other words, spring portions 17 are arranged to be a subsidiary feature of spring portion 16, the broadened areas beyond the shorter slots properly belonging to the stiffer portion 16 rather than softer portions 17.

In operation, the stiffer spring portion 16 will always tend to seek its nearest stable position, almost independently of the concurrent positioning of weaker portions 17. The latter, even when bent as far as they will go in opposition to the general curvature, do not develop enough force to move the central portion out of a stable position. But on the other hand the stiff portion will determine the positioning of the compliant portions in the absence of outside forces. Because the latter are connected to the former at points partaking of its motion, they will always snap over, when permitted to do so, to imitate its curvature. So it is the stiffer portion 16 which is the dominant portion inasmuch as it determines the direction of the bias exerted by all three portions.

The flexible section of the snap spring member is provided with four rivet holes at its middle, two in the relatively stiff, dominant portion and one each in the relatively soft, subsidiary portions. The armature is mounted to the dominant portion and the control element is mounted to the two subsidiary portions. Since the control element forms a rigid assembly, the two softer spring portions are restrained from separate motion despite the fact that they are located apart from each other. They are further restrained from separate motion by being integral with a single, continuous surface at either end. In operation they function as a single entity.

Glass envelope 4 includes glass buttons which seal its ends and also serve for sub-assembly and to seal off pins 18 and 19 where they penetrate the glass. (See FIG. 1.) All of the components within the envelope are ultimately supported by that envelope. Spring member 9 is supported by pins 18 which are welded within channels 12 and extend therefrom through the glass end buttons. Pole pieces 5A and 5B are supported by pins 19. Supplemental bracing may be utilized within the envelope, but no such bracing is shown because it would needlessly clutter and obscure the drawings. The design of such bracing is well within the capabilities of the ordinary artisan.

Pins 18 and 19 should, of course, be made of an alloy suitable for sealing in glass. After the glass envelope and its contents are assembled, it may either be evacuated or filled with an inert gas. The processes for accomplishing either objective are well known and need not be reviewed here. Note that pins 18 and 19 serve not only as supporting members, but also as conductors and terminals so that electrical connection may be made from the outside to contacts 6 and 10.

The glass envelope may be fastened to coil 1 by means of cement, potting of the entire assembly, or by outer enclosing structure not shown. The coil itself can be conventional in every respect. The presence of a pair of wire leads to the coil and suitable terminals for same is assumed, though not shown in the drawings.

Operation is best described with reference to FIGS. 3 through 5. In the quiescent state of FIG. 3 snap spring member 9 serves to hold the armature and the control element both at their left extremes of travel. The left pair of contacts is closed and will remain so in the absence of energization of the coil. The only effective gap in the magnetic circuit is that existing between the armature half 7B and pole piece 5B.

When the coil is energized (by causing an electrical current to flow through its windings) a magnetic pull will be developed across the indicated gap. At the same instant there will be developed an attraction between control element segment 8A and polepiece 5A. The armature is free to move to the right, against the biasing of the snap spring, but the control element is attracted in the opposite direction, and so is constrained to remain in place with segment 8A "sticking" to the pole piece. As the armature moves to the right it does not experience any appreciable opposing magnetic pull that would retract from its pull to the right, because no corresponding gap is opened up at the left side. Iron segment 8A keeps the reluctance at the left end of the armature low and constant.

Therefore, upon energization the movable parts will assume the positions shown in FIG. 4. These positions will be maintained as long as energization persists. The dominant portion 16 of the snap spring has found its second stable position and the bias in that direction will have assisted the armature over the last portion of its travel (thus compensating for waning pull as armature and pole piece overlap). But meanwhile, subsidiary spring portions 17 have had sharper curvature imparted to them and now have their end portions directed to the right. This biases the control element to snap to the right and it would do so but for the continuing attraction to pole piece 5A. However, as soon as energization of the coil is discontinued that attraction ceases and the control element will snap to the position shown in FIG. 5.

The net result, then, of energizing and de-energizing the coil is to shift the movable parts from their positions of FIG. 3 to their positions of FIG. 5. The period of energization can be extremely brief, so that the energizing current can be in the form of a short impulse. It can be seen that FIG. 5 is skew-symmetric to FIG. 3 and that the magnetic situation in the two cases is exactly comparable. Obviously, the application of a second impulse will bring the movable parts back to their positions of FIG. 3. The intermediate condition while the second impulse still persists would be depicted by FIG. 4 with its movable parts transposed with respect to left and right.

*Some Design Considerations*

Design considerations applicable in the case of the present invention are radically different, in some respects, from those applied in the design of prior art relays. One who would apply the invention should receive some instruction as to how to arrive at suitable dimensions and as to how to adapt the illustrative embodiment for individual applications or variously available manufacturing methods. To provide such instruction I shall now discuss the more important components separately. I hope, in the process, to clarify my nomenclature and to make it clear just what is and is not essential to each element in order that it may contribute to my inventive combinations (and thereby to the state of the art).

With particular reference to the glass envelope: One of the great fruits of the invention is that the unique arrangement of components that is taught makes it practical for the first time for all moving parts and contacts of an alternate impulse relay to be encapsulated in a hermetically sealed envelope. Such encapsulation, in turn, makes it possible to protect the contacts from arcing and contamination, thus vastly extending their lifetime. Because of these circumstances the envelope may be considered a legitimate element of the invention, as it contributes to the other elements and they to it.

On the other hand, the possibility of encapsulation is not the only benefit of the invention. One might dispense with the envelope entirely and still reap many advantages. Therefore, regarding the invention in a broader sense, the envelope need not be considered to be an essential element.

Glass is not the only suitable material from which the envelope can be made. Fused quartz and certain ceramics can also be used. Even metal can be used, provided that a non-magnetic, non-contaminating alloy be selected for the purpose. Furthermore, the function of the envelope would remain the same if it were made other than tubular in outline. I shall therefore, in the claims, avoid any such limiting term as "glass tube." I shall, instead, use the term "hermetic enclosure" and intend it to embrace all suitable constructions as indicated in this paragraph.

With particular reference to the pole pieces: If the hermetic enclosure were to be omitted from an embodiment such as that shown in FIG. 1, the obvious thing to do would be to combine pole piece 5A with stator member 3A and pole piece 5B with stator member 3B. This would make two members out of the four and there would not then exist any separately distinguishable "pole piece."

In order to speak generically of either a separate pole piece or a combined element I shall use the term "magnetic member."

In order to be useful in the invention it is not necessary that the magnetic members have the particular shapes of those shown in the illustrative embodiment. It is merely essential that they be suitably shaped to extend into the hole in the coil from opposite directions and that they be displaced laterally from each other at their central ends. I take "longitudinal" to mean in directions parallel to the axis of the coil and I take "lateral" to mean perpendicular to a longitudinal direction.) The important thing is to provide for substantially lateral travel of the moving parts within the coil. Magnetic members constructed as just specified will so provide. Note that I have not included a requirement that said members be made long enough to overlap, as they do in the illustrative embodiment. Such overlapping is a mere design detail; efficient designs are possible in which the magnetic members just meet, or just fail to meet longitudinally speaking. It is at least possible, furthermore, to accommodate any longitudinal gap whatsoever between these members by increasing the corresponding dimensions (the vertical ones in the drawings) of armature and control element. However, those who would apply the invention are advised that any arrangement resulting in magnetic attraction being exerted only on widely separated diagonally opposed corners of the armature would be an undesirable one, inasmuch as it would make poor use of the armature iron.

Regarding the shapes of the magnetic members at their inner ends, great variation is possible if a certain lateral symmetry is observed. The ends may have holes in them, they may be blunt, pointed, or even scalloped. To clarify this point design considerations bearing on pole piece shapes will be briefly discussed.

First of all, it is necessary to provide for the "tangential approach" of the armature mentioned in connection with the illustrative embodiment. This involves arranging the shapes of the magnetic members with regard to the shape of the armature (regarded in cross section normal to its line of travel) so that the latter presents an edge, not a surface, to either of the former as it approaches. The clearance between respective parts as they meet and pass should be made reasonably small, but not so small as to induce a side pull that would twist the supporting spring and deflect the armature. I do not use the word "tangential" is such a strict sense as to imply that the gap should tend toward zero as the stroke progresses.

It follows from the above that if the ends of the magnetic members were to be made blunt, the indicated construction would bear resemblances to that to be found in the familiar vibrator used in automobile radios. But those skilled in the art will appreciate that if the flux across the gap is to be confined to a line or band, rather than distributed over an area, then that band had best be made as long as possible for the sake of increased pull. In the present case it is more feasible to depart from the blunt shape than it is in the case of the vibrator, because in the interior of a coil there is some confinement of the flux. The periphery of the gap will be extended as the contour where armature and pole face each other is made more elaborate. In theory, one could adopt a complex arrangement of interlocking edges. Practically speaking however, one is limited to two general choices: either the face of the armature can be arranged to partially surround the end of the magnetic member, at a given extreme of the stroke, or the magnetic member can be arranged to partially or completely surround the face of the armature. The second alternative listed has been adopted in the case of the illustrative embodiment. That is, each pole piece is provided with a slot in its end and the armature face approaches and recedes from envelopments in that slot. It should nonetheless be apparent that the other alternatives described are obvious equivalents.

In further connection with the pole pieces in the illustrative embodiment, it might be mentioned that while they might be said to be forked, they are not forked in the sense that there exist two alternative paths for the flux. Neither tine of the "fork" is favored at any part of the operating cycle.

With particular reference to the armature: It has already been stated that the armature and each pole of the fixed magnetic structure must be so shaped that the one will make a tangential, not a head-on, approach to the other. It is merely a matter of interpretation whether one chooses to say that the magnetic member must be shaped to match the armature or that the armature must be shaped to match the magnetic member. From the standpoint of the armature, the requirement in detail is that when viewed from the direction of a fixed pole said armature must present an outline complementary to that of said pole. For instance, if each magnetic member terminates in a narrowed rectangular portion, then the armature must be H-shaped in the specified aspect, so as to admit one pole in its upper opening and the other pole in its lower opening. (The cross bar in the H could, of course, be dispensed with at the cost of some magnetic pull.)

The two-piece construction of the armature shown in the drawings is a purely optional design feature. If the snap spring were provided with a hole as large as the necessary armature cross section, then the armature could extend right on through the spring as a single integral member.

Considerable freedom is available in determining the length of stroke to be allotted to the armature. The principles of the device permit it to be either quite long or quite short. In the case of embodiment as a computational relay the logical choice would be to make it short, since in that application a very small contact opening will suffice. The only practical limitation on how short the stroke can be made is the snap spring geometry, along with the attendant necessity to allow, in production, latitude for aberrations in individual snap springs.

With particular reference to the control element: In previous patent applications (listed below) I have called components corresponding with this one by other and different names. I now believe "control element" to be the most suitable term, for a number of reasons. If it were remarked that the same term has been used to refer to the appropriate grid in a vacuum tube, one could point out in reply that there is here a close analogy in terms of function.

It should by now be clear that the control element need not have the particular shape shown and described in connection with the illustrative embodiment. One skilled in the art will be able to accomodate its shape to whichever shapes are adopted for armature and pole. In order for the control element to fulfill its function of shunting out either working gap as required, its iron will obviously have to be shaped to match the outline of each magnetic member where that member adjoins the armature. The clearance between armature and control element iron should, in general, be approximately the same as that between armature and pole.

Attention is directed to the fact, apparent from FIGS. 3 through 5, that one of the two iron segments 8A and 8B is idle and performs no particular function during any given half-cycle of operation. In the sequence shown it is segment 8B which is idle. Hence, it is clear that basic operating principles would not be affected if the segments were extended toward each other until they become a single, integral piece of iron (assuming alterations in the snap spring suspension to permit the change). There would be a slight penalty inherent in this alteration, however. The arrangement shown in the drawings provides some magnetic isolation for the unused segment. Lacking this isolation, more of the flux across the open one of the gaps would be diverted to the control element at the onset of energization, perhaps resulting in a loss of pull.

Regardless of the construction chosen for the control element, there are three remedies available for any undesirable diversion to that element of flux from the working gap. The first of these remedies is to thicken the fixed poles, or locate them closer to the axis of the coil, so that the initial gap between armature and pole will be reduced in proportion to the gap between pole and control element. The second remedy is to make the stroke of the control element longer than the stroke of the armature. For convenience the respective strokes have been depicted in the drawings as equal in length. However, some adjustment is possible, inasmuch as the limits on the two are separately set. The third remedy, which is mentioned here solely for the convenience of the reader, is to apply the invention taught and claimed in my co-pending application Serial No. 795,255 (now Patent No. 2,972,091), for an Electromagnetic Device. Briefly, this would involve arranging the control element to make a short stroke of its own just prior to the armature stroke.

With particular reference to the snap spring member: What is most essential about this element for purposes of the central invention is that it constitutes but a single, integral piece and is yet able to perform the following separate functions: (1) It renders the armature bistable by biasing the latter toward one or the other of its extreme positions. (2) It biases the control element toward whichever extreme corresponds with that occupied by the armature.

The teaching of the illustrative embodiment will prepare the skilled mechanic to produce one type of a member that is capable of performing the listed two functions. That teaching will now be generalized by pointing out what is basic to the design, in order that other suitable designs may be derived. It is first necessary to have a principal spring portion that is symmetrically bistable. Such bistability always arises from an imparted strain of some sort, but it does not matter for the purposes of the invention just how that strain is imparted. The strain may be internally maintained, as in the familiar "oilcan" spring, or it may be externally imposed, as by the spring mountings. (I use the term "bistable portion" without regard to how the bistability is imparted.) In addition to this bistable spring portion it is necessary to provide another, connected spring portion. This latter portion must be so arranged that it will yieldably transmit from the first, or dominant, portion an impulse to move in accordance with the motions of said dominant portion. The way to accomplish this is to have the second spring portion softer or more resilient, and to have it join the dominant portion at a movable point on same. The two portions, as specified, constitute a biasing means which may be employed in some form of the invention.

Note that it is not necessary that the subsidiary portion of the resilient member itself be bistable. Further, it is not necessary that the subsidiary portion be divided, in turn, into two separate areas, as it is in the illustrative embodiment. Still further, it is not necessary that the subsidiary portion join the dominant portion at more than one point.

Most important of all, it should be noted that it is not necessary to rely upon any one particular mode or principle of bistability in the dominating spring portion. This means that suitable arrangements may be derived from many snap spring or toggle spring designs found in the prior art. It is possible that some spring members so derived might bear little external resemblance to the spring member of the illustrative embodiment, while yet embodying the same basic principles.

Where a spring member can be arranged to fulfill the added function of providing the support for movable magnetic members, as in the illustrative embodiment, a great deal of added usefulness and inventiveness is thereby contributed to the combination. The improvement will boost the service life from a matter of millions of operations to a matter of billions, because it permits doing away completely with wearing parts. It also contributes to the rest of the combination in a unique spatial sense to permit the whole to be smaller and simpler and to facilitate encapsulation.

In the form adopted for the illustrative embodiment, the biasing means may readily have its dimensions adjusted for the performance expected of it. It can be seen that broadening or narrowing the respective flexible portions will adjust their degree of stiffness. Much attention should be given to the matter of proportions. If the material used is too thin, for instance, or if one imparts too little bow in proportion to length, then considerable differences may show up between units produced by identical methods. With care, however, good reproductibility and extreme miniaturization may be achieved. I have reason to believe that stroke lengths (for both armature and control element) on the order of a few thousandths of an inch can be achieved in production.

I fully contemplate that the biasing means I have described may be useful in devices which resemble, but which are patentably different from, the overall device described herein.

With particular reference to the coil: A coil, to be usable in my invention, must have a hole through its center. Otherwise, there are no particular limitations as to its shape or construction. The adjective usually used to indicate that a coil has an open hole through its center is "solenoidal" and I shall use the term "solenoidal coil" in my claims.

With reference to all elements: The design of incidental components not treated here is entirely conventional and should be well within the capabilities of one skilled in the art.

I have, for the sake of convenience, referred to components and parts of components as being made of "iron." Although a pure, soft ingot iron is an excellent material for the purpose, I do not mean to imply that it is the only one that can be used. Other suitable magnetic materials, such as the so-called "relay steel," are known to those skilled in the art.

I have already defined my usage of "lateral." When I say "substantially lateral," I means more lateral than longitudinal (i.e., less than 45° out of a lateral plane).

*Relation to Prior Art*

The nearest prior art is represented by my Patent No. 2,885,606 for an Impulse Type Electromotive Device. The present invention may be regarded as an improvement on the invention disclosed in that patent, inasmuch as the present invention makes use of some basic principles first taught in said prior patent. However, the present disclosure teaches a radically new and different way to utilize those principles.

What is new in the present invention is, first of all, the unusual spatial arrangement of the parts, which would not be suggested by anything in the reference. While said reference discloses a solenoidal arrangement in which the armature and control element are located generally within the interior of a coil, it shows those parts moving longitudinally, not laterally as in the present invention. Furthermore, it shows (in the solenoidal embodiment) the control element iron as being applied to the armature, instead of to the poles as in the present instance.

As a benefit of the newer arrangement, the size and mass of moving parts are drastically reduced. This means, in turn, that operation will be faster and less likely to be affected by vibration. As a further benefit of the newer arrangement, room is allowed within the hole in the coil for the inclusion therein of biasing means, contacts, and related components. By contrast, the arrangement of the reference would not allow room within the coil for any such components and would not suggest how any such room could be provided. As a still further benefit of the newer arrangement, hermetic sealing-off of the contacts and moving parts is permitted; this is practical and feasible because nothing movable need extend out of the hole in the coil. Such hermetic sealing would clearly be impractical in the case of any arrangement taught in the reference.

Besides the new spatial arrangement, the present invention also provides a unique and highly useful means for mounting and for biasing the movable parts. (Attention is directed to the discussion in the previous section with relation to the biasing means.) Nothing even vaguely suggestive of this element is disclosed in the reference.

Turning to the prior art in general, it can be observed that the alternate impulse devices until now available can be classified under four fairly descriptive titles: ratchet types, rocker-pawl types, latch-unlatch types, and auxiliary armature types. (The types under the last heading perhaps most resemble the present invention, although they are not much in current use. References to most of them were cited in the course of the prosecution of my earlier patent above identified.) No official or widely used type names exist, but those skilled in the art will understand my classification. Note that even the names by which one must call these types suggest or evoke their complexity and the sources of wear they respectively incorporate. Many relays of these types have been commercially produced and most perform admirably, within their inherent limitations. Such limitations have until now been accepted as inevitable, on the theory that alternate impulse actuation is in itself a little out of the ordinary and one must expect to pay a price to achieve it.

However, where a relay is to be applied in computational service, it must exceed all of such limitations. As pointed out in the introductory section herein, a relay intended for computational applications must be reliable, long-lived, compact, and fast-acting.

A relay employing all of the aspects of my invention is reliable and long-lasting because of its extreme simplicity—and because it incorporates no wearing parts! The moving parts do not pivot, nor do they slide, nor even roll. Scuffing, if any, is infinitesimal, since butting surfaces approach each other at strict right angles to their meeting surfaces. A usual source of failure in relays, namely contact trouble, is virtually eliminated through the hermetic encapsulation of contacts.

A relay according to my invention is compact because it need take up no more room than the single coil that energizes it. It is also compact because of its inherent efficiency. (Any electromagnetic device suffers a loss of efficiency in the process of being scaled down, so that a greater efficiency can purchase a smaller size.) The efficiency I point to arises, in turn, from the complete lack of friction, the low mass of moving parts, the freedom from the necessity for maintaining high contact pressures, the short armature stroke, and the relatively low parasitic flux.

A relay according to my invention is fast-acting because its moving parts are small with regard to the remainder of the magnetic circuit; because it is adaptable to miniaturization, making the moving parts smaller yet; because of the total absence of friction; and because the stroke of the moving parts may be made quite short.

What I claim is:

1. An electromagnetic device including at least: a generally solenoidal coil; two magnetic members extending from opposite directions into the hole in the coil, the central ends of said members being laterally spaced; an armature mounted between the central ends of the magnetic members for substantially lateral limited motion toward one or the other of said ends, said armature being so shaped for tangential approach to said ends; a control element including magnetic material to be movable into position against one or the other of said magnetic members for selectively shunting one or the other of the gaps between said magnetic members and said armature; and resilient means for biasing said armature toward the extremes of its travel and for concurrently biasing said control element toward that one of said magnetic members to which said armature is currently adjacent.

2. The combination of claim 1 further characterized in that said resilient means comprises a single integral member including both a relatively stiff bistable portion connected to the armature and a relatively soft portion extended from a movable region of said stiff portion and connected to the control element.

3. The combination of claim 2 further characterized in that said biasing means furnishes the principal support for said armature and said control element.

4. The combination of claim 3 further including electrical contacts actuable by said armature; and still further including a hermetic envelope enclosing a plurality of the components of the device including at least said armature and said contacts.

References Cited in the file of this patent

UNITED STATES PATENTS

| | | |
|---|---|---|
| 2,036,295 | Piffath | Apr. 7, 1936 |
| 2,096,502 | Wetzel | Oct. 19, 1937 |
| 2,322,235 | Howard | June 22, 1943 |
| 2,391,444 | Burch | Dec. 25, 1945 |
| 2,508,381 | Frerer | May 23, 1950 |
| 2,518,480 | Lilja | Aug. 15, 1950 |
| 2,727,108 | Chisholm | Dec. 13, 1955 |
| 2,885,606 | Clements | May 5, 1959 |
| 2,953,654 | Bauder | Sept. 20, 1960 |
| 2,972,091 | Clements | Feb. 14, 1961 |

UNITED STATES PATENT OFFICE

CERTIFICATE OF CORRECTION

Patent No. 3,118,987 January 21, 1964

Warner W. Clements

It is hereby certified that error appears in the above numbered patent requiring correction and that the said Letters Patent should read as corrected below.

Column 3, line 23, for "melting" read -- meeting --; column 4, line 55, for "retract" read -- detract --; column 6, line 59, for "envelopments" read -- envelopement --; column 10, line 56, strike out "so"; line 57, after "material" insert -- mounted --.

Signed and sealed this 16th day of June 1964.

(SEAL)
Attest:

ERNEST W. SWIDER
Attesting Officer

EDWARD J. BRENNER
Commissioner of Patents